(12) United States Patent
Minehara (10) Patent No.: US 9,174,304 B2
(45) Date of Patent: Nov. 3, 2015

(54) LASER DECONTAMINATION DEVICE

(71) Applicant: Eisuke Minehara, Ibaraki (JP)

(72) Inventor: Eisuke Minehara, Ibaraki (JP)

( * ) Notice: Subject to any disclaimer, the term of this patent is extended or adjusted under 35 U.S.C. 154(b) by 0 days.

(21) Appl. No.: 14/351,934

(22) PCT Filed: Oct. 24, 2012

(86) PCT No.: PCT/JP2012/006823
§ 371 (c)(1),
(2) Date: Apr. 15, 2014

(87) PCT Pub. No.: WO2013/061587
PCT Pub. Date: May 2, 2013

(65) Prior Publication Data
US 2014/0263221 A1    Sep. 18, 2014

(30) Foreign Application Priority Data

Oct. 25, 2011    (JP) ................................. 2011-234385

(51) Int. Cl.
*B23K 26/36* (2014.01)
*G21F 9/28* (2006.01)
(Continued)

(52) U.S. Cl.
CPC ......... *B23K 26/0066* (2013.01); *B23K 26/0807* (2013.01); *B23K 26/1405* (2013.01); *B23K 26/36* (2013.01); *G21F 9/005* (2013.01); *G21F 9/28* (2013.01); *G21F 9/30* (2013.01)

(58) Field of Classification Search
CPC ........... B23K 26/0807; B23K 26/1405; B23K 26/36; B23K 26/046; B23K 26/048; B23K 26/0066; G21F 9/005; G21F 9/28; G21F 9/30

USPC ............. 219/121.68, 121.83, 121.73, 121.74, 219/121.75
See application file for complete search history.

(56) References Cited

U.S. PATENT DOCUMENTS 4,473,074 A * 9/1984 Vassiliadis ............... 219/121.74
5,530,221 A * 6/1996 Benda et al. ............. 219/121.83
(Continued)

FOREIGN PATENT DOCUMENTS

CA        2193200        12/1995
CA        2159887        4/1996
(Continued)

OTHER PUBLICATIONS

Ogawa et al., "Development of Laser Decontamination Technique," *Technical Report of Japan Nuclear Cycle Development Institute*, Jun. 2002, Issue No. 15, pp. 59-66 (with partial translation).
(Continued)

*Primary Examiner* — Geoffrey S Evans
(74) *Attorney, Agent, or Firm* — Oliff PLC (57) ABSTRACT

The laser decontamination device includes: a laser oscillator; a scanning device provided with an XY axis scanner and a Z axis scanner to condense the laser beam emitted from the laser oscillator onto the surface of the contaminated article without the intervention of any compound lens such as an f θ lens so as to optically scan the surface; and a surface shape measuring device to measure the surface shape of the contaminated article, the Z axis scanner being provided with a focus position controlling section to automatically adjust a focus position in accordance with an irradiation position such that a focus of the laser beam comes on the surface of the contaminated article based on a shape data obtained at the surface shape measuring device.

8 Claims, 3 Drawing Sheets

(51) Int. Cl.
  *B23K 26/00*  (2014.01)
  *G21F 9/00*  (2006.01)
  *G21F 9/30*  (2006.01)
  *B23K 26/08*  (2014.01)
  *B23K 26/14*  (2014.01)

(56) References Cited

U.S. PATENT DOCUMENTS

| | | | |
|---|---|---|---|
| 5,690,845 | A | 11/1997 | Fuse |
| 5,736,709 | A * | 4/1998 | Neiheisel ............... 219/121.68 |
| 5,780,806 | A * | 7/1998 | Ferguson et al. ....... 219/121.68 |
| 5,882,487 | A * | 3/1999 | Li et al. ......................... 134/1 |
| 5,965,042 | A * | 10/1999 | Saitoh ..................... 219/121.68 |
| 6,486,435 | B1 * | 11/2002 | Beyer et al. ............... 219/121.8 |
| 6,747,243 | B1 * | 6/2004 | Reinhardt ............... 219/121.69 |
| 8,518,331 | B2 | 8/2013 | Minehara |
| 2002/0050489 | A1 * | 5/2002 | Ikegami et al. .......... 219/121.68 |
| 2003/0226832 | A1 * | 12/2003 | Liu et al. ................. 219/121.69 |
| 2004/0112882 | A1 * | 6/2004 | Miyairi et al. ........... 219/121.86 |
| 2005/0194365 | A1 * | 9/2005 | Li ............................ 219/121.68 |
| 2006/0255024 | A1 * | 11/2006 | Fukuyo et al. ........... 219/121.72 |
| 2007/0095800 | A1 * | 5/2007 | Chen .......................... 219/121.6 |
| 2007/0114213 | A1 * | 5/2007 | Chen ........................ 219/121.75 |
| 2008/0110869 | A1 * | 5/2008 | Chen ........................ 219/121.75 |
| 2008/0178905 | A1 * | 7/2008 | Turner et al. ............. 219/121.68 |
| 2008/0212063 | A1 * | 9/2008 | Kurita et al. ..................... 356/3 |
| 2009/0092157 | A1 * | 4/2009 | Gapontsev ......................... 372/6 |
| 2009/0321395 | A1 * | 12/2009 | Hu et al. .................. 219/121.67 |
| 2010/0078419 | A1 * | 4/2010 | Johansen et al. ......... 219/121.79 |
| 2010/0269851 | A1 | 10/2010 | Minehara |
| 2011/0024403 | A1 * | 2/2011 | Bradley et al. .......... 219/121.67 |
| 2012/0021559 | A1 * | 1/2012 | Cheng et al. ............... 219/121.6 |

FOREIGN PATENT DOCUMENTS

| | | |
|---|---|---|
| DE | 69509236 | 12/1999 |
| DE | 69522522 | 5/2002 |
| DE | 69527858 | 5/2003 |
| EP | 706072 | 4/1996 |
| EP | 0765523 | 4/1997 |
| EP | 0882540 | 8/2002 |
| ES | 2129833 | 6/1999 |
| GB | 9412238 | 6/1994 |
| JP | A-3022303 | 12/1995 |
| JP | 3022303 U | 3/1996 |
| JP | A-8-108289 | 4/1996 |
| JP | A-10-502166 | 2/1998 |
| JP | A-2000-346991 | 12/2000 |
| JP | A-2004-193267 | 7/2004 |
| JP | A-2007-315995 | 12/2007 |
| JP | A-2010-82663 | 4/2010 |
| JP | A-2010-256274 | 11/2010 |
| JP | A-2011-102812 | 5/2011 |
| KR | 10-0234491 | 12/1999 |
| WO | WO 95/03575 | 2/1995 |

OTHER PUBLICATIONS

International Search Report issued in International Patent Application No. PCT/JP2012/006823 dated Jan. 29, 2013.
Written Opinion issued in International Patent Application No. PCT/JP2012/006823 dated Jan. 29, 2013.
Jan. 29, 2013 Written Opinion issued in International Patent Application No. PCT/JP2012/006823.
Minehara, Eisuke J., "The Review of Laser Engineering," The Review of Laser Engineering, vol. 40, No. 3, Mar. 2012, pp. 165-170.
Boing, Lawrence E., "Decommissioning of Nuclear Facilities Decontamination Technologies," Manila, Philippines, Oct. 2006, 35 pages.
Sep. 3, 2012, Boing, Lawrence E., "Decontamination Technologies," Argonne National Laboratory Decommissioning Program, U.S. Department of Energy, pp. 1-56.
Sep. 22, 2003, Bayliss, et al., "Nuclear Decommissioning, Waste Management, and Environmental Site Remediation," UKAEA, ELSEVIER Butterworth Heinemann, 2003, Charter 10, "Decontamination Techniques," pp. 89-97.

* cited by examiner

(a) During Laser Irradiation  (b) After Laser Irradiation

Fig.4

Explanation of Thermal Spallation by Laser Thermal Input

Fig.5

LASER DECONTAMINATION DEVICE

TECHNICAL FIELD

The present invention relates to an improvement on a laser decontamination device, in details, pertaining to such device allowing the containers and equipment contaminated by RI (Radioisotopes) in nuclear power plants under recovery owing to the nuclear accidents or under decommissioning, facilities in which such RIs are stored, nuclear reprocessing factories, nuclear fuel storage facilities, accelerator facilities and so forth to be decontaminated with efficiency and decontamination performance to be further enhanced than the conventional counterpart.

BACKGROUND ART

Conventionally, such decontamination method by laser is known as irradiating substantially parallel light pulse laser beams of lower average power output onto the surface of the objects contaminated by the RIs with such objects linearly or planarly scanned, the device employing which method is characterized in that the contaminants deriving from RIs, which are black and others in color and higher in photoabsorption, are vaporized for removal without doing damage on the base metal and as such.

However, according to the above method by which the pulse laser beams are rendered into parallel light, making the condensed area smaller for the purpose of enhancing the power density (irradiation intensity) unavoidably leads to causing uneven irradiation, so that the same spot shall be irradiated several times. On the other hand, enlarging an irradiation area of one pulse causes the power density to be lowered (in the order of some $MW/cm^2$ or less) so that the irradiated beams result in being reflected from the lustrous metallic surface, with the result that the RIs advanced deeply into the microscopic cracks on the metallic surface cannot be removed at all.

Further, conventionally, besides the above-mentioned laser decontamination, such decontamination employing a sandblast, a sander and a grinder is carried out, according to which mechanical methods in order to remove the attached RIs, it is general that a portion of the surface of the object contaminated by them is scraped off by the thickness ranging from 0.05 mm to 0.1 mm or more However, according to the above-mentioned mechanical methods, during the grinding not only the RIs are ready to reenter the surface so as to cause recontamination, but also the grinding device (such as the nozzle of the sandblast) is secondarily contaminated by the grinding particles of the sandblast, the grinding belt of the sander or grinder or the grinding disk that are used repeatedly.

Further, providing that the sandblasts and sanders secondarily contaminated by the grinding particles or belt are exchanged with new ones every time the decontaminations are carried out, it makes the cost incurred for exchanging such mechanical devices and their parts so bulky that not only the decontamination cost goes overboard, but also a large volume of secondary wastes are produced, which is unfavorable in view of the cost-saving aspect and the eco-friendly trend.

On the other hand, conventionally, such method is known as the objects contaminated by the RIs being clipped into the solution containing an oxidant and a reductant so as to make the contaminants solved into the solution, according to which chemical method it requires a lot of disposal cost to dispose with a large volume of ion-exchange resins used for separating the RIs from the wasted solution, which resins are burnt so as to be reduced in volume and stabilized with concrete and the like for storage.

Further, in recent years, such technique is proposed as the pulsed laser beams whose peak output is 10 MW or higher (for instance, refer to Document 1) being employed, according to which technique it is unable to focus the laser beams on the surface of the object contaminated by the RIs with precision, so that the power density (irradiation intensity) in the order of $GW/cm^2$ cannot be secured. Moreover, uneven irradiation density might happen on the surface of the object with irregularities.

Furthermore, where such high-output pulsed laser beams are employed, it requires that the thermally induced diffusion and reattachment of the RIs be taken into due account, besides, with the method by which the laser beams are irradiated with the laser head moved, because there is limit in the scanning velocity for the low-velocity motion even when it might be automatically scanned, the thermally induced diffusion of the RIs is aggravated in which the portions onto which the beams are irradiated result in being extensively and deeply fused and thermally affected. Such method is also known (refer to non-patent literature 1) as fusing the surface of the object by CW (Continuous Wave) laser beams of high output power and removing the fused portions by a pressurized gas, which method is also subjected to aggravated thermal effect so as to make the thermally induced diffusion of the RIs further aggravated.

On the other hand, a laser machining device in which a focal length is adjusted with a beam expander in use is also well known (refer to Patent Literature 2), but with such device, the condensing optical system including compound lenses are disposed posterior to the XY scanner, so that it often happens that measuring a surface shape with a laser range finder fails because the reflected light from the object is under the influences of such compound lenses and as such. Further, passing the machining and measuring laser beam through the compound lenses and as such makes such beam greatly attenuated, so that the available machining laser beam unavoidably results in being smaller in output power.

CITATION LIST

Patent Literature

Document 1: Japanese Patent Unexamined Application Publication No. 2004-193267.
Document 2: Japanese Patent Unexamined Application Publication No. 2010-82663.

Non-Patent Literature

'Development of Laser Decontamination Technique' contributed by Ryuichiro OGAWA et. al to the technical report of Japan Nuclear Cycle Development Institute, pp. 59-66, Issue No. 15 of June 2002.

SUMMARY OF INVENTION

Technical Problem

In view of the above-mentioned problems found in the conventional technology, the present invention is to provide a laser decontamination device allowing the power density high enough to remove inclusively the RIs advanced deeply into the contaminated article to be secured and uneven irradiation density to be prevented even when there are irregularities on the surface of the object to be decontaminated and further the thermally induced diffusion and recontamination of RIs to be done without as well as favorably leading to further equipmental and operational cost reduction as well as more eco-friendly and efficient decontamination operation.

Solution to Problem

The means adopted by the inventor to solve the above problems is explained below with reference to the accompanying drawings.

That is to say, the laser decontamination device according to the present invention comprises a CW laser oscillator 1 used for a light source of a machining laser beam $L_1$; a scanning device 2 provided with an XY axis scanner 21 to reflectively and two-dimensionally scan the laser beam $L_1$ through two beam reflectors 21a; and a Z axis scanner 22 to adjust a focal distance of the laser beam $L_1$ through a variable focus lens and a movable lens 22a, which Z axis scanner 22 is disposed nearer to the light source than the XY axis scanner 21 and which scanning device 2 condenses the laser beam $L_1$ scanned by the XY axis scanner 21 and the Z axis scanner 22 on a surface of a contaminated article T without an intervention of any compound lens such as an f θ lens (hereinafter, referred to as compound lens); and a surface shape measuring device 3 to measure a surface shape of the contaminated article T by an optical means employing a laser range finder 31 and the XY axis scanner 21, in which the Z axis scanner 22 is provided with a focus position controlling section 24 to automatically adjust a focus position according to an irradiation position such that a focus of the laser beam $L_1$ comes on the surface of the contaminated article T based on a shape data obtained at the surface shape measuring device 3, thereby, allowing the laser beam $L_1$ to be three-dimensionally scanned over and irradiated onto the surface of the contaminated article T with the focus position of the beam aligned onto the surface of the contaminated article T.

Further, as for the laser oscillator 1 and the scanning device 2 as mentioned above, a single mode fiber laser of higher average output power allowing the beam to be focused onto a minute spot having 10 μm or smaller in diameter is adopted for the former while the output of the laser oscillator 1 is adjusted and the optical system is designed such that the laser beam $L_1$ is irradiated onto the surface of the contaminated article T with the power density of 1 GW/cm² or higher so as to enhance the thermal spallation, evaporation and sublimation of the contaminated article T without melting in proportion to the power density up to the second power thereof. This enhances the velocity and efficiency with which the decontamination proceeds. Further, the decontamination is readily available for stainless steel and so forth having surface cracks into which RIs are advanced deeply and unable to be decontaminated by the conventional laser methods.

Further, with a fiber laser provided with an optical fiber whose diameter is smaller used for the laser oscillator 1, emitting the laser beam $L_1$ directly onto the beam reflectors 21a from the optical fiber allows the reducing optical system in which the diameter of an image point is made smaller than that of an object point to be done without. In other words, there is no need to use the reducing optical system that causes the scanning velocity and the scanning aerial velocity to lower.

On the other hand, for the surface shape measuring device 3, a laser range finder 31 that irradiates a measuring laser beam $L_2$ onto a target on the surface of the contaminated article T and finds a distance from the phase difference by interference or the time difference between the irradiated light and its scattered light is adopted, which finder is disposed such that the measuring laser beam $L_2$ can be scanned simultaneously with or independently from the machining laser beam $L_1$ with the XY axis scanner 21 to scan the machining laser beam $L_1$, thereby, allowing the efficiency with which the same is measured to enhance.

Further, as for the disposition of the laser oscillator 1, the scanning device 2 and the surface shape measuring device 3 respectively, the laser oscillator 1 is disposed away from the scanning device 2, in which a fiber laser having an optical fiber smaller in diameter is adopted for the laser oscillator 1. Further, the Z axis scanner 22, the dichroic mirror 33 (the mirror that reflects the measuring laser beam $L_2$ from the laser range finder 31 towards the XY axis scanner 21 and transmits the machining laser beam $L_1$ passing through the Z axis scanner 22 and going towards the XY axis scanner 21) and the XY axis scanner 21 are disposed in this order between the emitting end of the optical fiber and the laser window 23.

Then, arranging the scanning velocity of the XY axis scanner 21 with the higher velocity of 10 m/s or faster and the scanning velocity and the focused beam size of the XY axis scanner 21 such that the reciprocally scanned machining laser beam $L_1$ is irradiated onto an arbitrary irradiation spot on the surface subjected to the irradiation with the duration of nanoseconds permits the contaminated article to be non-thermally spalled, evaporated and sublimed with the influence of thermal conduction minimized even when the laser beam $L_1$ is irradiated with such a high power density as being 1 GW/cm² or higher, with the result that the problems with the diffusion and reattachment of the RIs can be overcome.

Further, as for the focus position controlling section 24, in order to efficiently spall, evaporate and sublime the RIs with a higher power density and without uneven irradiation density, it is set such that the surface of the contaminated article T to be irradiated is adjustively placed within the range of the depth of focus (Rayleigh length) of the laser beam $L_1$ or in the vicinity thereof.

On the other hand, to the laser decontamination device arranged as mentioned above, adding a gas jet-spraying device 4 to blow off particles with an inert gas jet-sprayed in the angular direction contrary to the scanning direction of the laser beam $L_1$ onto the surface of the contaminated article T onto which the machining laser beam $L_1$ is being irradiated and with the irradiated surface constantly covered with the inert gas; and a removals collecting device 5 to suction and to collect the removals containing radioactive substances blown off by the gas jet-spraying device facilitates the collection of the removals containing the RIs and prevents even the slightest secondary contamination.

Further, making the scanning device 2 drivable in a wider area of the surface of the contaminated article T with the laser oscillator 1 carried on a remote-controlled robot R provided with the self-running means and the scanning device 2 mounted onto the arm section A of the remote-controlled robot R permits decontamination to be performed without the possibility of any operators being exposed to such contaminant, in which sequentially irradiating the laser beams with the arm section remotely controlled allows decontamination to be efficiently performed even when a wall surface larger in area is decontaminated.

Advantageous Effects of Invention

The invention brings the following favorable effects.
According to the present invention, making the laser beam converged onto minute regions on the surface of the contaminated article by means of the imaging optical system (Z axis scanner) and the focal length of the laser beam precisely adjustable in accordance with the surface of the contaminated article by means of the Z axis scanner permits the power density of the laser beam to be increased up to in the order of GW/cm$^2$ that is larger almost by three orders of magnitudes than the conventional counterpart, so that inclusively the RIs advanced deeply into the contaminated article can be completely spalled, evaporated and sublimated along with the base material.

Further, according to the present invention, the condensing optic system is disposed nearer to the light source than the XY axis scanner such that the measuring laser beam emitted from the laser range finder does not pass through such system, with the result that the surface shape of the target can be accurately measured. Likewise, not using the numeral pieces of compound lenses permits a laser beam of high output power to be irradiated onto the object contaminated with the RIs with such beam hardly attenuated or without the apprehension that the lenses comprising such system might be broken.

Moreover, according to the present invention, based on the data (cubic map) of the surface shape of the contaminated article measured by the surface shape measuring device, the focus position controlling section of the Z axis scanner automatically adjusts the focus of the laser beam according to an irradiation position, so that time and labor-saving decontamination can be performed without uneven irradiation density even when the surface of the contaminated article can be irregular.

Further, arranging the scanning device with the XY axis scanner employing the beam reflectors (such as galvano-mirrors) and the Z axis scanner employing the movable lens (or a variable focus lens) as described in the present invention allows the scanning velocity of the laser beam to be further enhanced than when the surface of the contaminated article is scanned with the laser head moved, which enables non-thermal machining to be performed even with the laser beam whose power density is higher, with the result that the thermally induced diffusion and reattachment of the RIs can be prevented.

Furthermore, with the CW laser that continuously emits laser beams $L_1$ used for the laser oscillator 1, the focused beam size can be rendered pretty smaller than that of the pulse laser so that not only irradiation density can be set higher, but also it allows the three-dimensional scanning to be performed with precision in accordance with the surface shape of the contaminated article. Also in the aspect of the related cost, it can be saved further than the pulse laser, the cost of which device per laser unit output is higher and the efficiency of which conversion from electricity to beam is lower.

Furthermore, with the laser decontamination device according to the present invention, it enhances the performance with which the RIs are decontaminated further than the conventional counterparts and does without any sections thereof being made into direct contact with the contaminated article as in the case of such counterparts, so that it solves the prior problems with the secondary contamination and the operators being exposed to radioactive substances as well as in the aspect of cost reduction, it does without exchanging the contaminated device itself or the parts thereof and disposing with the ion-exchange resins, with the result that the decontamination cost can be reduced. Further, even when the components of the device such as containers or cases might be contaminated, they can be decontaminated by the device itself.

Accordingly, the present invention allows the removal performance of the RIs to be far further improved than the conventional laser decontamination devices and provides the laser decontamination device that solves the prior problems with environmental pollution caused by the wasted secondary contaminants produced by the decontamination methods other than the laser method and with the exorbitant cost incurred for disposing with such wastes, so that the industrial applicability thereof is very high.

DESCRIPTION OF EMBODIMENTS

First Embodiment

The first embodiment of the invention is explained with reference to FIGS. 1 to 4, in which the laser oscillator 1, the scanning device 2, the surface shape measuring device 3, the gas jet-spraying device 4 and the removals collecting device 5 are illustrated.

(Arrangement of the Laser Decontamination Device)

Figure 1:
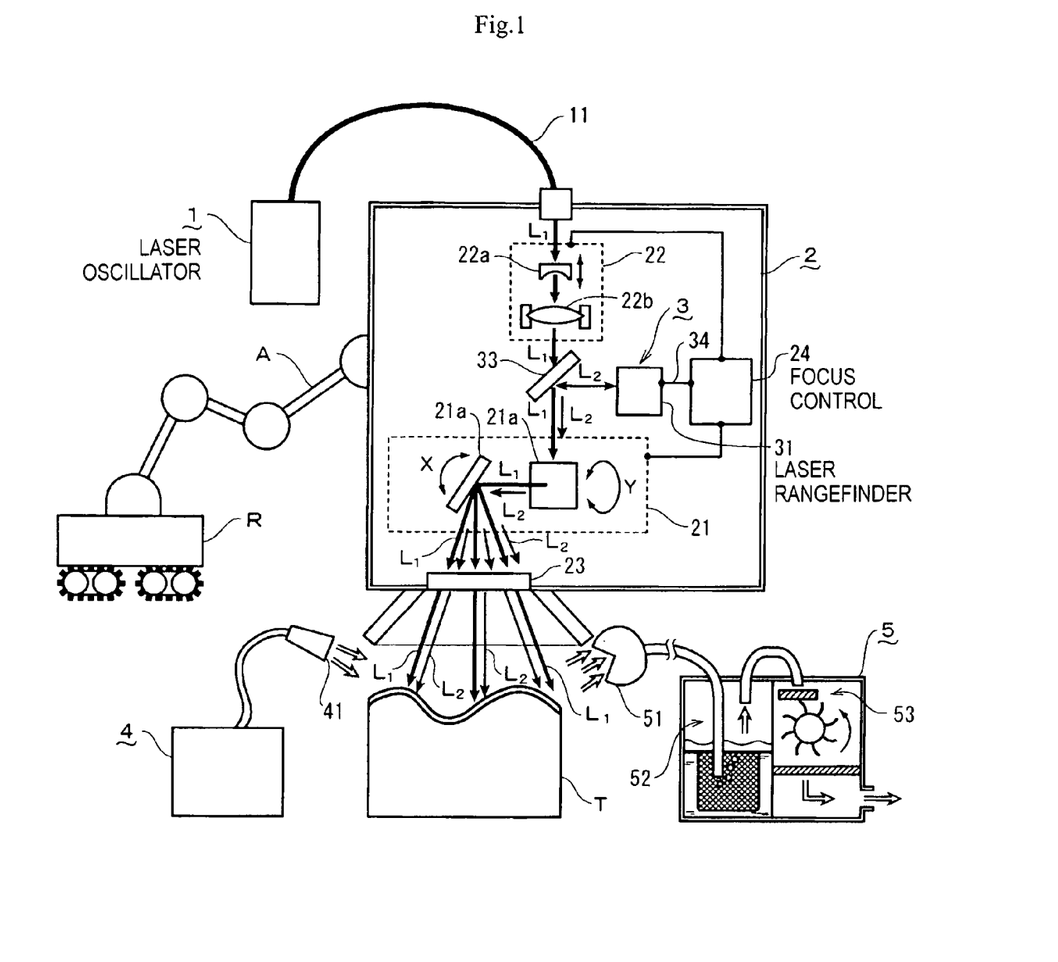
FIG. 1 is a schematic view showing the laser decontamination device according to the first embodiment of the invention.

According to the first embodiment, the laser oscillator 1 that is the light source of a machining laser beam $L_1$ is connected through a long optical fiber 11 to the scanning device 2 that condenses the laser beam $L_1$ onto the surface of a contaminated article T for scanning. To note, the fiber laser provided with the optical fiber 11 smaller in diameter is used for the laser oscillator 1.

Further, in the present embodiment, in order to further enhance the power density of the laser beam $L_1$, not the pulse laser, but the CW laser by which a focused beam size can be minimized is adopted for the laser oscillator 1. Further, the CW laser costs lower than the pulse laser and its electricity to beam conversion efficiency is higher than the latter so that it is practically excellent in the cost-saving aspect (in the case of the pulse laser, the contaminated surface can be deeply peeled off, but causes uneven decontamination density or some parts of such surface to be remained without being decontaminated).

Figure 2:
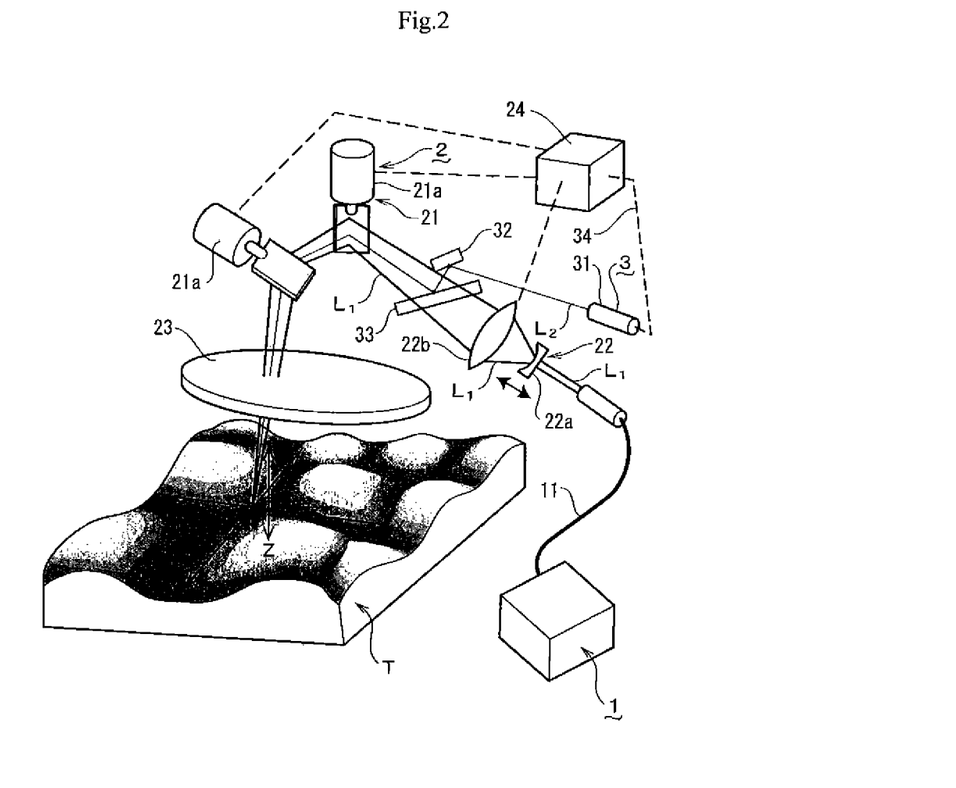
FIG. 2 is a schematic view to explain the optical system of the laser decontamination device according to the first embodiment of the invention.

Further, as for the afore-mentioned scanning device 2, it comprises an XY axis scanner 21 to two-dimensionally and reflectively scan the laser beam $L_1$ with beam reflectors 21a and 21a (galvano-mirrors) and a Z axis scanner 22 to adjust the focal distance of the laser beam $L_1$ with a movable lens 22a and a fixed lens 22b comprising the condensing optic system, in which the laser beam $L_1$ passed through both the scanners is emitted onto the target from the laser window 23.

To note, the afore-mentioned Z axis scanner 22 is disposed nearer to the light source (between the laser oscillator 1 and the XY scanner 21) than the XY axis scanner 21 and the laser beam $L_1$ scanned by the XY axis scanner 21 is irradiated onto the object without the intervention of any compound lenses.

Furthermore, the scanning device 2 is provided with the surface shape measuring device 3 to measure the surface shape of the contaminated article T. In this embodiment, the laser range finder 31 that irradiates the measuring laser beam $L_2$ onto the target and finds a distance from the phase difference by interference or the time difference between the irradiated light and the scattered light thereof is used for the surface shape measuring device 3 and is disposed such that the scanning of the laser beam $L_2$ can be performed with the XY axis scanner 21.

Hereupon, the measuring laser beam $L_2$ of the laser range finder 31 is emitted from the laser window 23 through a mirror 32, a dichroic mirror 33 (disposed on the optical path between the Z axis scanner 22 and the XY axis scanner 21) and the XY axis scanner 21. In turn, the scattered light is entered into the laser range finder 31 through the laser window 23, the XY axis scanner 21, the dichroic mirror 33 and the mirror 32.

To note, the measuring laser beam $L_2$ of the laser range finder 31 can be scanned simultaneously with the machining laser beam $L_1$ with the XY axis scanner 21 for the purposes of performing the real-time shape measurement and machining, and the measuring laser beam $L_2$ may be scanned independently before the machining laser beam $L_1$ is scanned. Further, the shape data obtained at the laser range finder 31 are sent to the scamming device 2 through a data transmission means 34.

Then, irrespectively of whether or not the real-time shape measurement and machining is performed, the Z axis scanner is provided with the focus position controlling section 24 to automatically adjust a focus position according to an irradiation position such that the focus of the laser beam $L_1$ comes on the surface of the contaminated article T based on the shape data obtained at the surface shape measuring device 3, thereby, allowing the laser beam $L_1$ to be three-dimensionally scanned over and irradiated onto the surface of the contaminated article T.

Likewise, in the present embodiment, the focus position controlling section 24 is set such that the surface of the contaminated article T to be irradiated is adjustively placed within the range of the depth of focus (Rayleigh length) of the laser beam $L_1$ or in the vicinity thereof, but the focus spot can be freely adjusted by modifying the setting of the focus position controlling section 24 where necessary.

Figure 3:
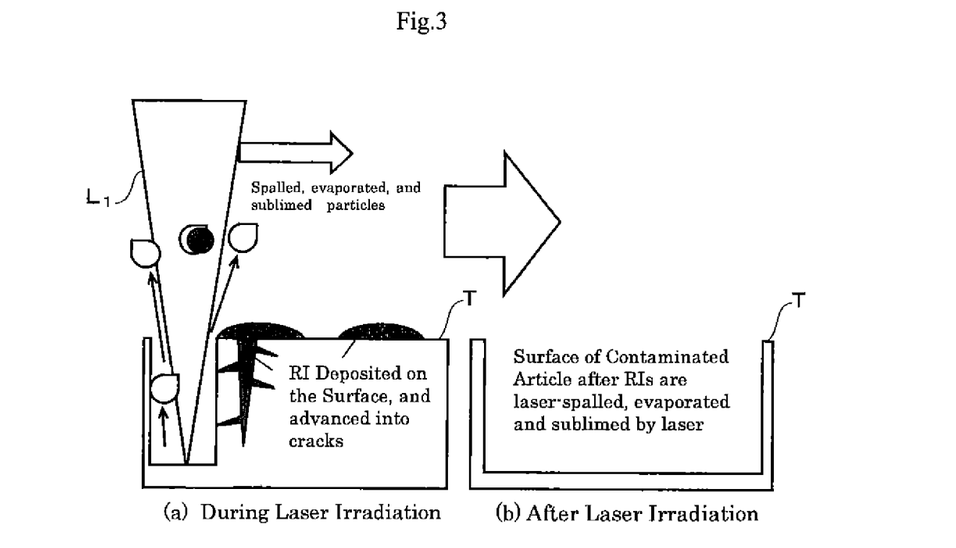
FIG. 3 is an explanatory view to show the effect brought into metals by the laser decontamination device according to the invention.

Then, as mentioned above, the advantage that the focus position of the laser beam $L_1$ on the surface of the contaminated article T can be precisely adjusted permits the power density of the laser beam $L_1$ to be enhanced further than before, with the result that even when the RIs might invade into the contaminated article T through its cracks, as shown in FIG. 3, they can be momentarily spalled, evaporated and sublimated along with the base material by the laser beam $L_1$.

Figure 4:
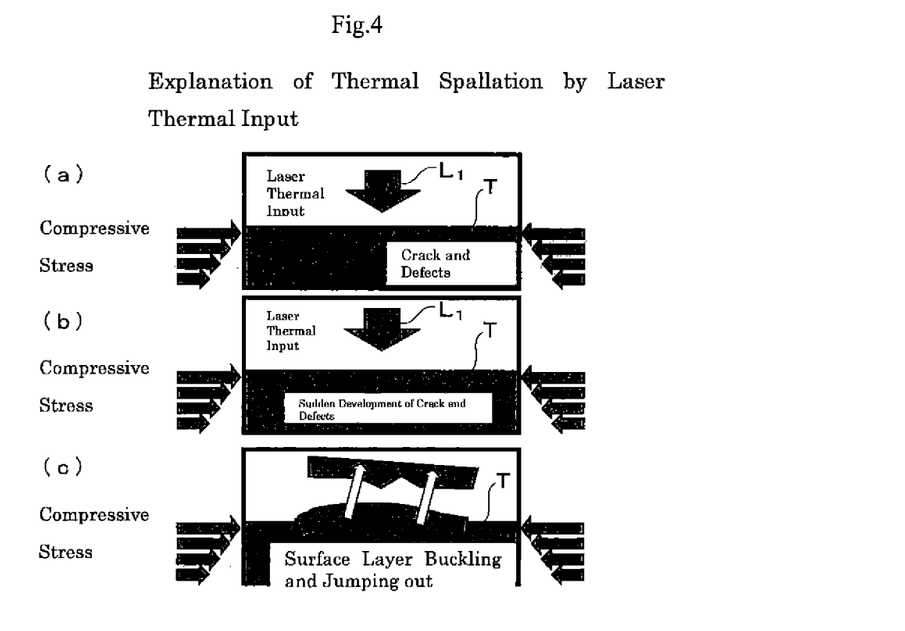
FIG. 4 is an explanatory view to show the effect brought into concrete and ceramics by the laser decontamination device according to the invention.

Elaborating further on the mechanism by which the contaminant is spalled by the laser beam $L_1$, in the heated surface of the contaminated article irradiated by the laser beam $L_1$, microscopic cracks and defects existing in the inner layer of such surface start developing as shown in FIG. 4 (a) and further develop as shown in FIG. 4 (b). Such inner layer is subjected to large compressing stress from the surrounding non-irradiated sections as shown in FIG. 4 (c) so as to be finally buckling out and jumping out the matrix and base material. To note, the degree to which and the detailed process by which the contaminated article is spalled, evaporated and sublimated differ according to materials to be irradiated.

Figure 5:
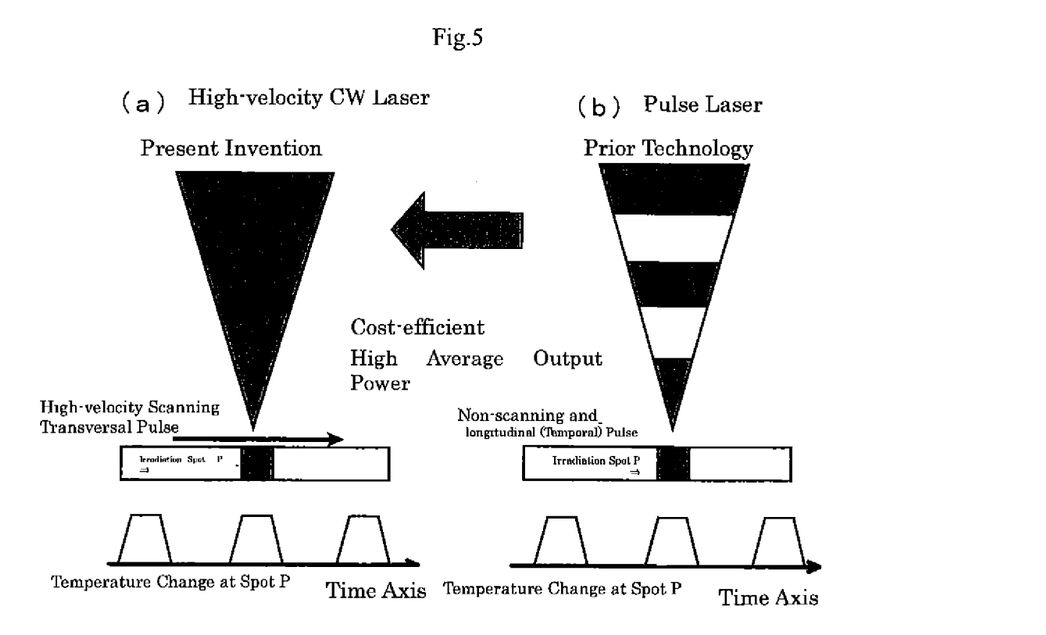
FIG. 5 is a view to explain the transversal pulse according to the high velocity scanning by the laser decontamination device according to the present invention and the longitudinal pulse according to the conventional timing pulse device.

Moreover, in the present embodiment, as with the scanning velocity of the scanning device 2, it is set at 10 m/s or higher and as shown in FIG. 5 (a), the scanning velocity and the focused beam size of the XY axis scanner 21 are set such that a minute focused beam spot of the machining laser beam $L_1$ reciprocally running in the scanning direction is irradiated onto an arbitrary irradiation spot P on the irradiated surface during the duration of nanoseconds.

The above allows the decontamination device to cost lower and to be rendered higher in output power than the conventional pulse laser irradiation type as shown in FIG. 5 (b) (e.g., as disclosed in Japanese Patent Unexamined Application No. 2007-315995) as well as non-thermal machining free from uneven irradiation density to be feasible. To note, the aforementioned high velocity laser machining is realized by the XY axis scanner 21 and the Z axis scanner 22 that scan the laser beam $L_1$ with a small-sized optical member rotated with high velocity or moved with a driving motor.

Furthermore, in the present embodiment, the output of the CW laser and the Z axis scanner 22 are designed such that the power density is higher by three orders of magnitudes than that of the conventional counterpart (more concretely speaking, set at 1 $GW/cm^2$ or higher), so that most of the materials including stainless steel can be subjected to decontamination.

On the other hand, in this embodiment, the laser device is provided with the gas jet-spraying device 4 to spray an inert gas from the outlet 41 to the angular direction substantially contrary to the scanning direction of the laser beam $L_1$ onto the surface of the contaminated article T onto which the machining laser beam $L_1$ is being irradiated, which device 4 allows the irradiated surface of the contaminated article to be constantly covered with an inert gas and the spalled, evaporated and sublimed particles to be blown off.

Further, as for the removals blown off by the gas jet-spraying device 4, at the removals collecting device 5, those suctioned from the suction port 51 are collected into the dusts collector 53 with a filter bag through the dusts separation catcher 52 (water-sealed metallic net). To note, the spalled, evaporated and sublimed particles of the contaminants containing the RIs as a whole are caught by the water-sealed metallic net on the way, so that even the slightest secondary contamination can be prevented.

Further, the scanning device 2 may well be mounted onto the arm section A of the remote-controlled robot R provided with the self-running means, thereby, controlling the robot R in a place away from it allowing the operators to perform the decontamination without being exposed to the radioactive substances. To note, adjusting the length of the optical fiber of the fiber laser permits the laser oscillator 1 to be disposed in a distant chamber or to be carried on the robot R.

Moreover, three-dimensionally controlling the arm section A permits the scanning device 2 to be driven at an arbitrary position on the surface of the contaminated article T, with the result that when a large wall surface and as such is decontaminated, controlling the arm section A with the position of the robot R fixed allows the decontamination to be efficiently performed.

The present invention is arranged substantially as described above, which is not limited to the above illustrated embodiment, but may be modified into various manners within the scope of the accompanying patent claims. For instance, for the laser oscillator 1, not only the fiber laser, but also a semiconductor laser, a solid-state laser or a gas laser capable of a high velocity scanning of 10 m/s and of such a high output power that the beam can be focused onto a minute area having 10 μm or smaller in diameter so as to reach the power density of 1 $GW/cm^2$ or higher (or lasers having the similar performance to Beam Parameter Product 0.3 mmmrad in the same level as the single mode fiber laser) may well be adopted.

Also as for the scanning device 2, the beam reflectors 21a (galvano-mirrors) of the XY axis scanner 21 may well be altered with a high-velocity electro-optical device or resonant mirror and as such. Further, the movable lens 22a of the Z axis scanner 22 may well be altered with a variable focus lens, which lens (comprising a liquid or crystal device) is electrically controlled so as to adjust a focal distance with high velocity.

Moreover, as with the surface shape measuring device 3 as well, it does not necessarily use the laser range finder 31, which may be replaced with other optical means (such as means for measuring the surface shape of the target with triangulation or images other than the phase difference in use, which means is capable of using minute optical paths having a diameter in millimeter or smaller over the whole optical path).

In turn, as for the removals collecting device 5, the other dusts separation catchers 52 on behalf of the water-sealed metallic net may well be used for catching the particles contaminated by the RIs. Further, the laser decontamination device itself may well be formed into a portable size or a large-installation size, any of which modifications also belong to the technical scope of the invention.

INDUSTRIAL APPLICABILITY

Owing to the recent meltdown of the nuclear reactors here, the government is scheduled to reinstate some of the damaged reactors or to decommission a number of the aged ones. It is prospected that the number of the reactors to be decommissioned in the future might increase so that it is hoped that various outstanding issues of the conventional decontamination methods (such as the operators being exposed to radioactive substances; recontamination caused by the contaminants containing the RIs; secondary wastes; exorbitant decontamination related cost; operational efficiency) be solved as soon as possible.

Under such circumstances, the laser decontamination device according to the invention is excellent in the basic function of removing the RIs from the contaminated articles on almost all of the materials such as carbon steel, stainless steel, titanium, aluminum, zirconium, tiles, concrete, zinc, glass, synthetic resins, coated films in comparison with the conventional counterparts; generates no repulsive force; costs lower; weighs lighter; is more readily feasible for automation; and further mitigates radiation exposure in comparison therewith, so that its industrial applicability is considered very high.

NOMENCLATURE 1 laser oscillator
11 optical fiber
2 Scanning device
21 XY axis scanner
21a Beam reflector
22 Z axis scanner
22a movable lens
22b Fixed lens
23 Laser window
24 Focus position controlling section
3 Surface shape measuring device
31 Laser range finder
32 Mirror
33 Dichroic mirror
34 Data transmission means
4 Gas jet-spraying device
41 Outlet
5 Removals collecting device
51 Suction port
52 Dusts separation catcher (water-sealed metallic net)
53 Dusts collector (with a filter bag)
T Contaminated Article
$L_1$ Machining laser beam
$L_2$ Measuring laser beam
R Remote-controlled robot
A Arm section
P Irradiation spot

The invention claimed is:

1. A laser decontamination device for use with a contaminated article, the laser decontamination device comprising:
   a CW laser oscillator configured to output a machining laser beam;
   a scanning device including: (i) an XY axis scanner configured to reflectively and planarly scan the machining laser beam with beam reflectors, and (ii) a Z axis scanner configured to adjust a focal distance of the machining laser beam with one of a variable focus lens and a movable lens, the Z axis scanner being disposed nearer to the CW laser oscillator than the XY axis scanner, the scanning device condensing the machining laser beam scanned by the XY axis scanner and the Z axis scanner on a surface of the contaminated article without intervention of any compound lens integrated with a plurality of lenses disposed between the XY axis scanner and the contaminated article; and
   a surface shape measuring device configured to measure a surface shape of the contaminated article by an optical means including a laser range finder and the XY axis scanner, wherein
   the Z axis scanner is provided with a focus position controlling section configured to automatically adjust a focus position according to an irradiation position such that a focus of the machining laser beam is oriented on the surface of the contaminated article based on shape data obtained by the surface shape measuring device to cause the laser beam to be three-dimensionally scanned over and irradiated onto the surface of the contaminated article with the focus spot aligned in pinpointing with the surface of the contaminated article to peel or sublimate contaminants off the surface of the contaminated article.

2. The laser decontamination device according to claim 1, wherein:
   the CW laser oscillator includes a single mode fiber laser having a large average output power is large and the laser machining beam is focused on a minute spot having 10 μm or smaller in diameter, and
   an output of the laser oscillator is adjustable and an optical system is configured such that the laser beam is irradiated onto a surface of the contaminated article at a power density of 1 $GW/cm^2$ or higher in a halt condition.

3. The laser decontamination device according to claim 1, wherein:
   a scanning velocity of the XY axis scanner is set at 10 m/s or higher, and
   a focused beam size of the XY axis scanner and a focused beam size are set such that the reciprocally scanned machining laser beam is irradiated onto an arbitrary minute spot on an irradiated surface during a duration of nanoseconds.

4. The laser decontamination device according to claim 1, wherein the focus position controlling section is set such that the surface of the contaminated article to be irradiated is adjustively placed within a range of a depth of focus (Rayleigh length) of the laser beam or in a vicinity thereof.

5. The laser decontamination device according to claim 1, wherein the surface shape measuring device includes a laser range finder that irradiates a measuring laser beam onto a target and finds a distance from one of a phase difference by interference and a time difference between an irradiated light and its scattered light, in which the laser range finder is disposed in front of the XY axis scanner such that the measuring laser beam can be scanned simultaneously with or independently from the machining laser beam with the XY axis scanner.

6. The laser decontamination device according to claim 1, wherein:
  the laser oscillator is disposed away from the scanning device and a fiber laser having an optical fiber with a small diameter is adopted for the laser oscillator, and
  the Z axis scanner, a dichroic mirror and the XY axis scanner are disposed in this order between an emitting end of the optical fiber and a laser window.

7. The laser decontamination device according to claim 1, further comprising:
  a gas jet-sprayer configured to blow off particles with an inert gas jet-sprayed in an angular direction substantially contrary to the scanning direction of the laser beam onto the surface of the contaminated article onto which the machining laser beam is being irradiated and the irradiated surface constantly covered with the inert gas; and
  a removals collecting device configured to suction and to collect removals containing radioactive substances blown off by the gas jet-sprayer.

8. The laser decontamination device according to claim 1, wherein the laser oscillator is carried on a remote-controlled robot provided with a self-running means and the scanning device is mounted onto an arm section of the remote-controlled robot so as to make the scanning device drivable in a wider area of the surface of the contaminated article.

* * * * *